United States Patent [19]

Cooper et al.

[11] Patent Number: 4,509,710
[45] Date of Patent: Apr. 9, 1985

[54] CABLE CLAMP

[75] Inventors: Ralph M. Cooper, Clemmons, N.C.; Walter M. Mena, Marietta, Ga.

[73] Assignee: AMP Incorporated, Harrisburgh, Pa.

[21] Appl. No.: 565,078

[22] Filed: Dec. 23, 1983

[51] Int. Cl.$^3$ .......................... F16L 3/08; B65D 63/00
[52] U.S. Cl. ..................................... 248/73; 248/68.1; 248/74.1; 24/16 PB; 24/17 AP
[58] Field of Search ........................ 248/73, 68.1, 74.1, 248/74.2; 24/16 R, 16 PB, 17 AP, 619, 620, 621, 622

[56] References Cited

U.S. PATENT DOCUMENTS

| | | | |
|---|---|---|---|
| 3,444,596 | 5/1969 | Soltysik | 248/73 |
| 3,944,177 | 3/1976 | Yoda | 248/73 |
| 4,295,618 | 10/1981 | Morota et al. | 248/73 |
| 4,379,536 | 4/1983 | Mizuno et al. | 248/73 |

Primary Examiner—Victor N. Sakran
Attorney, Agent, or Firm—Robert W. J. Usher

[57] ABSTRACT

A cable clamp moulded in one piece from plastics material comprising first and second clamping limbs (11, 11') extending in side-by-side relation and joined at respective opposite ends by first and second tool bearing portions (12, 13). Each clamping limb (11, 11') comprising a rigid portion (14, 14') joined to the first tool bearing portion (12) by a web hinge (16 or 16') at one end of the limb (11 or 11') and joined by another web hinge (19 or 19') to a flexible wire engaging portion (15, 15') adjacent the second bearing portion (13) such that on urging the tool bearing portions (12, 13) together, the clamping limbs are changed from erect to collapsed clamping conditions with deformation of the wire engaging portions (15, 15') into clamping engagement with wires. A latching tongue 25 is received in a latching eye (36) to latch the cable clamp in the clamping condition.

13 Claims, 8 Drawing Figures

CABLE CLAMP

The invention relates to a cable clamp for securing wires to each other or to a support.

There are a wide variety of cable clamps available for securing wires to each other or to supports. However, there remains a need for a cable clamp that is both inexpensive to manufacture and can be applied to a bundle of wires using simple, straight action, application tooling thereby also minimizing applied cost.

One particular requirement is for a cable clamp that can be applied to a row of parallel harness wires at any position along their length during a manufacturing cycle.

According to one aspect of the invention there is provided a cable clamp moulded on one piece from plastics material comprising first and second clamping limbs extending in side-by-side relation and joined at respective opposite ends by tool bearing portions, each clamping limb comprising a rigid portion at one end of the limb joined to a flexible wire engaging portion at the other end of the limb, laterally extending wire supporting surfaces being provided adjacent respective wire engaging portions such that on urging the tool bearing portions together, the clamping limbs are changed from an erect to a collapsed, clamping condition with deformation of the wire engaging portions around wires located adjacent the wire supporting surfaces thereby to clamp the wires against the wire supporting surfaces, means being provided on the cable clamp to latch the cable clamp in the clamping condition.

The cable clamp can be moved to the clamping condition by applying pressure to the tool bearing portions using simple application tooling.

Conveniently, the wire engaging portions of the clamping limbs are adjacent. More particularly, the rigid portion of each clamping limb is joined to a portion defining the tool bearing surface by a web hinge and shoulder portions are provided on each side of the web hinge arranged to interengage on collapse of the clamping limb to limit pivotal movement of the rigid portion relative to the tool bearing portion.

In a preferred construction, the latching means comprises an eye formed in one tool bearing portion and a tongue having a free end outstanding from the other tool bearing portion aligned for receipt in the eye by movement of the clamping legs from the erect to the collapsed, cable clamping condition thereby to bring latching detent means provided on the eye and free end of the tongue into latching engagement.

A leading edge of the tool bearing portion may be pointed to facilitate threading of the cable clamp between adjacent wires of the row of wires.

An example of a cable clamp according to the invention will now be described with reference to the accompanying drawings in which.

Figures 1, 1A:
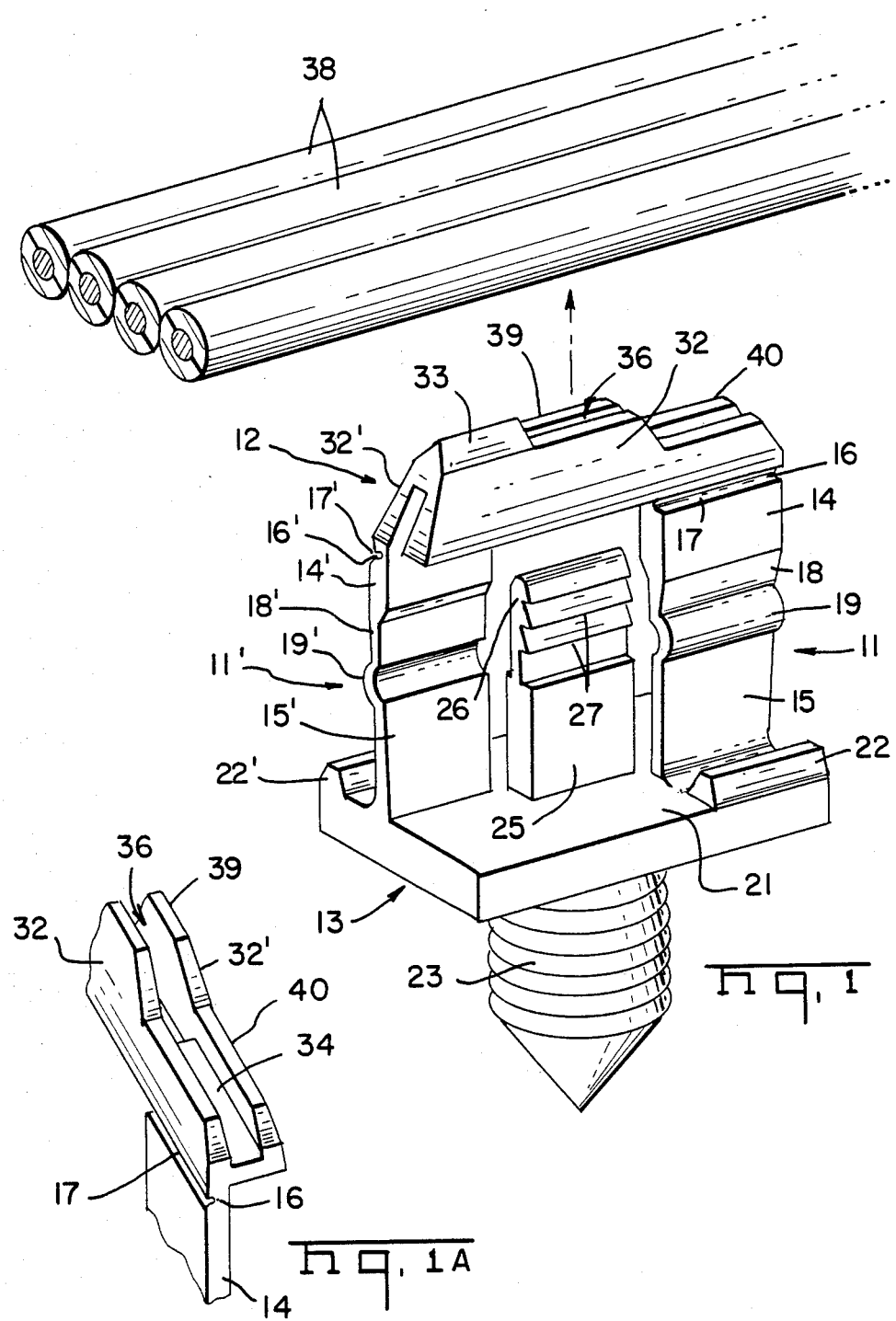
FIG. 1 is a perspective view of the cable clamp from one side prior to threading between cable wires.
FIG. 1a is a fragmentary perspective view from an opposite side.

The cable clamp is moulded in one piece from suitable plastics material and comprises first and second clamping limbs 11, 11' extending in side-by-side relation and joined at respective opposite ends by first and second tool bearing portions 12 and 13, respectively. Each clamping limb 11 or 11' comprises a rigid portion 14 or 14' at one end of the limb joined to a flexible, wire engaging portion 15 or 15' at the other end of the limb. The rigid portions 14, 14' are joined to the first tool bearing portion 12 by web hinges 16, 16' defining the bases of slots 17, 17' having divergent walls providing stop shoulders. From a location 18, 18' approximately midway along their length, the rigid portions taper towards arcuate second web hinges 19, 19' spaced laterally outwardly from a plane intersecting the first web hinge and joining the rigid portions 14, 14' to the flexible portions 15, 15', respectively. The flexible portions 15, 15' slope inwardly at a small angle to join the second tool bearing portion at a location spaced laterally outwardly from the webs 16, 16' to provide a small net outward inclination to the clamping legs. The second tool bearing portion 13 extends laterally outwards of the legs and provides a wire supporting surface 21, wire retaining ribs 22, 22' being provided on the lateral outer edges of the surface 21 laterally aligned and spaced from each leg. A fluted mounting member 23 extends from an undersurface of the tool bearing portion 13 for attachment to a support.

A latching tongue 25 having a free end 26 formed with latching detents 27 upstands from the upper surface of the tool bearing portion in a plane between each flexible portion 15, 15', the tongue 25 and flexible portions 15, 15' being located in planes spaced both laterally to facilitate straight drawn moulding and longitudinally (in the wire axis direction).

The first tool bearing portion 12 comprises elongate sidewalls 32, 32' extending in spaced apart relation between the rigid portions 14, 14' of the clamping arm, the sidewalls 32, 32' converging towards a free edge to facilitate threading. The sidewalls are joined adjacent the clamping arm 11' at opposite longitudinal ends by bridges 33, 34, bridge 33 having a pointed leading edge portion and bridge 34 being spaced from the leading edge. The opposed sidewalls 32, 32' define between them an eye 36 aligned with the free end 26 of the tongue 25, one surface of the sidewall 32' being formed with latching detents 37.

The space between the sidewalls 32, 32' admits mould core pins from opposite longitudinal directions to form the bridges 33, 34 and the leading ends of the sidewalls are stepped at 39 and 40 to facilitate entry of a mould core pin from one longitudinal direction to form the pointed edge portion of bridge 33 and the latching detents 37.

Figure 2:
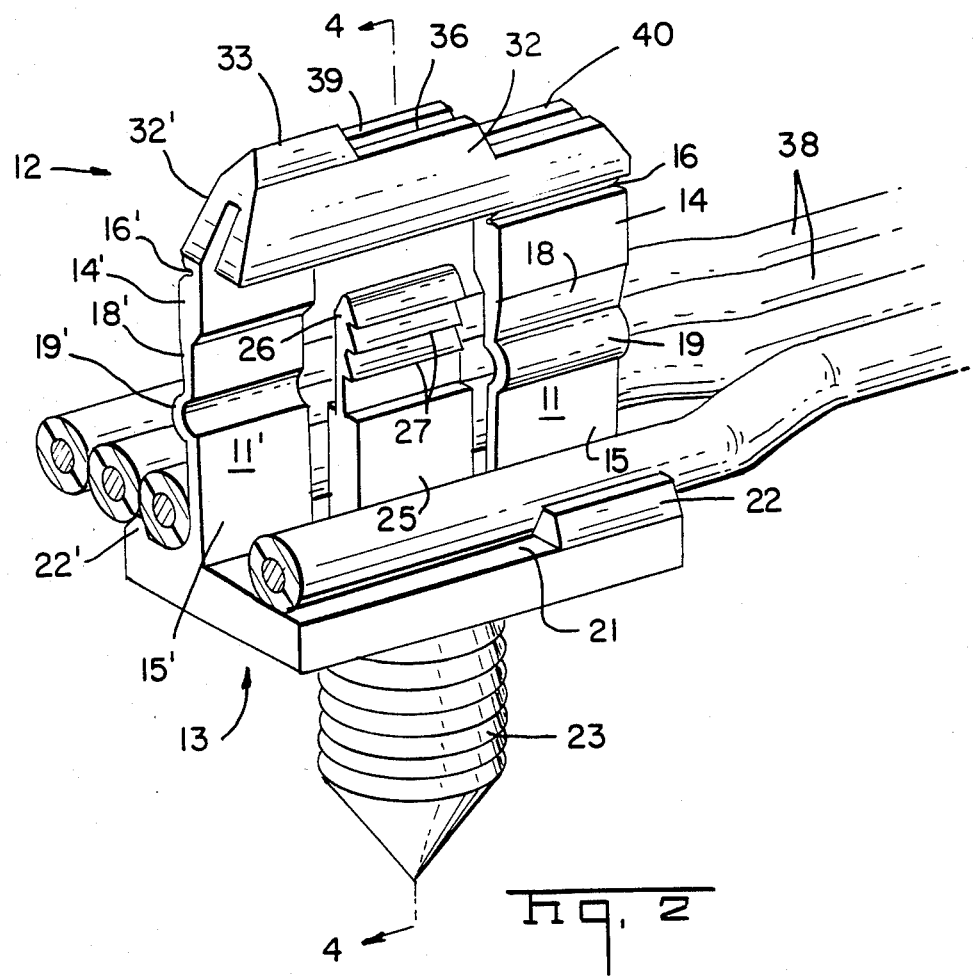
FIG. 2 is a perspective view of the cable clamp after threading but prior to application to clamp cable wires.
Figure 3:
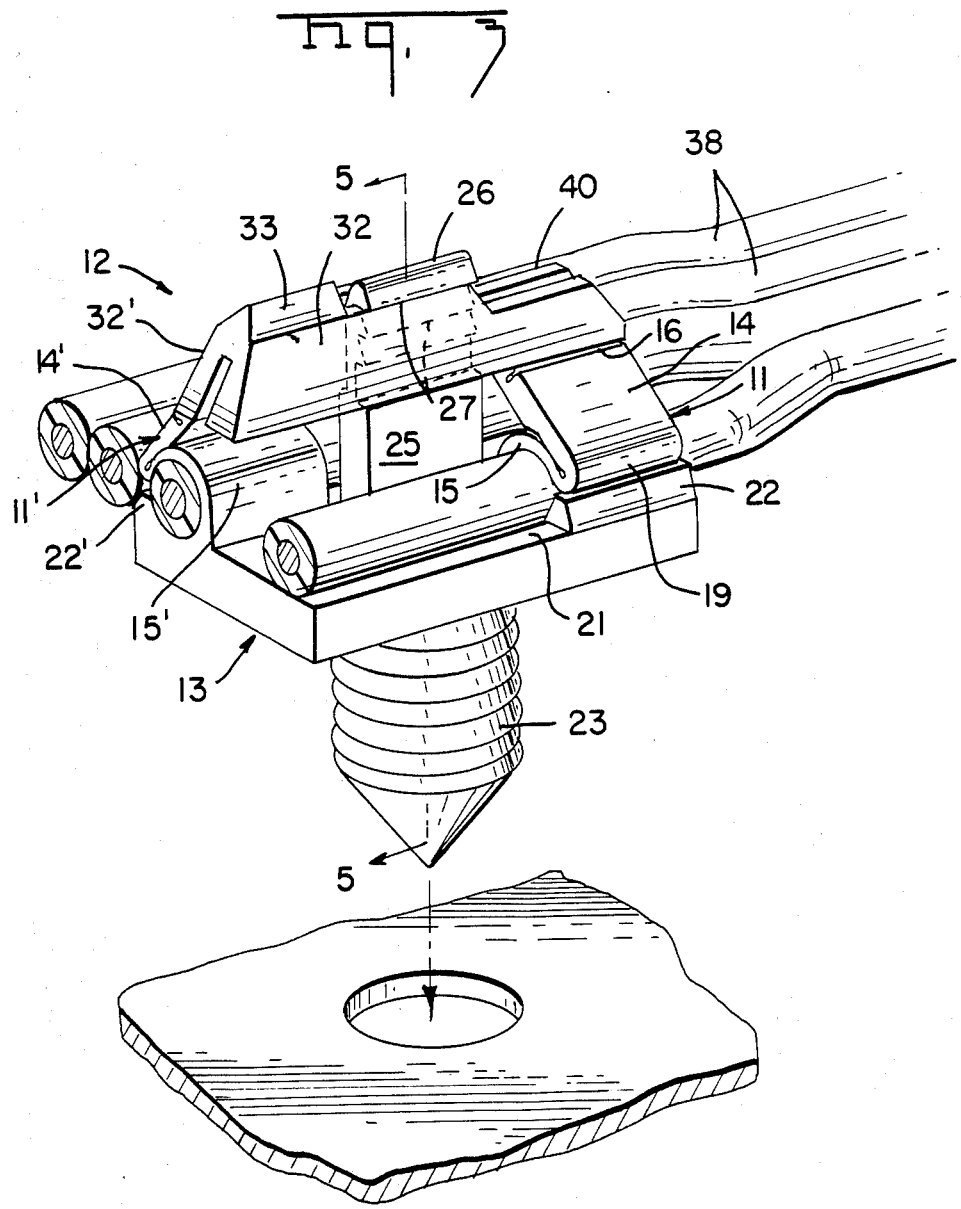
FIG. 3 is a similar view of the cable clamp in a wire clamping condition.
Figure 4:
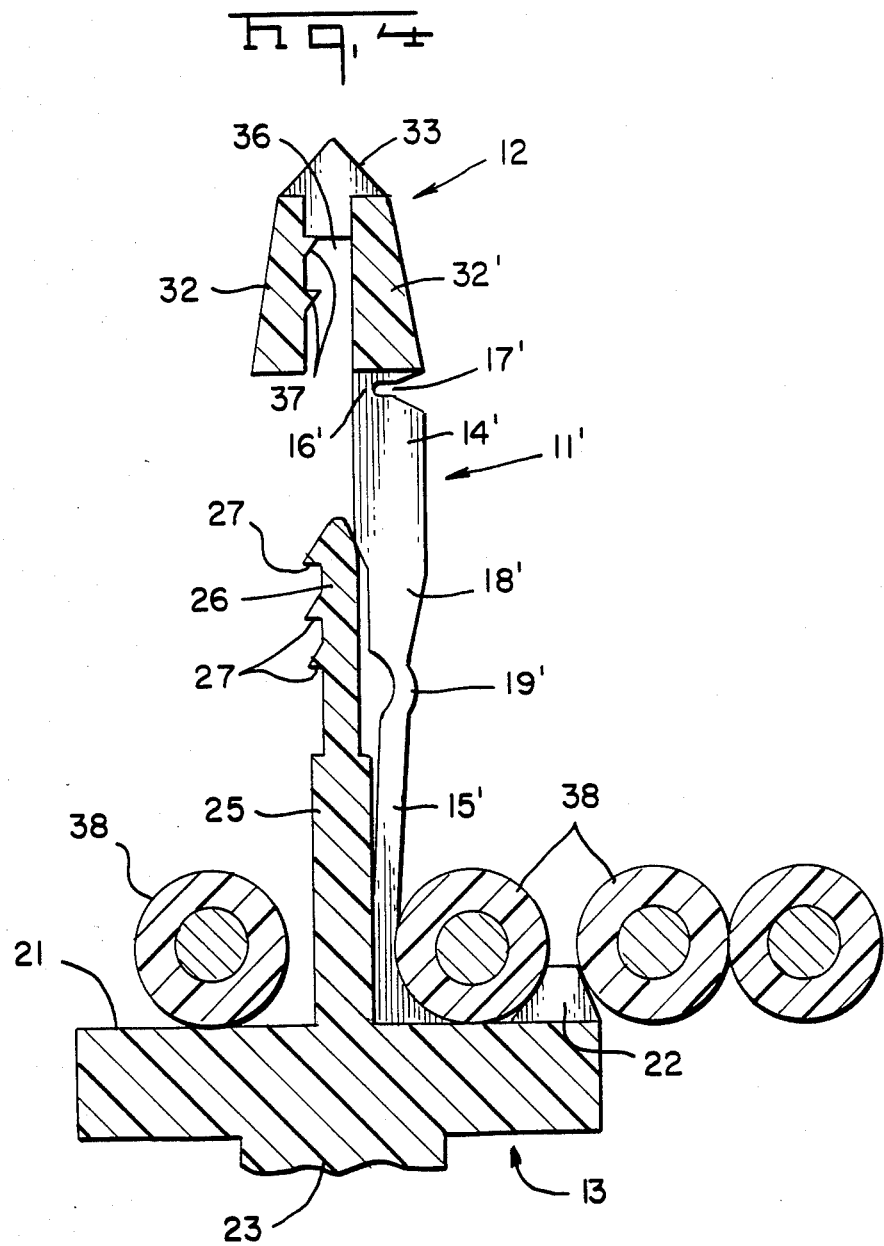
FIG. 4 is a cross-sectional view taken along line 4—4 of FIG. 2.
Figure 5:
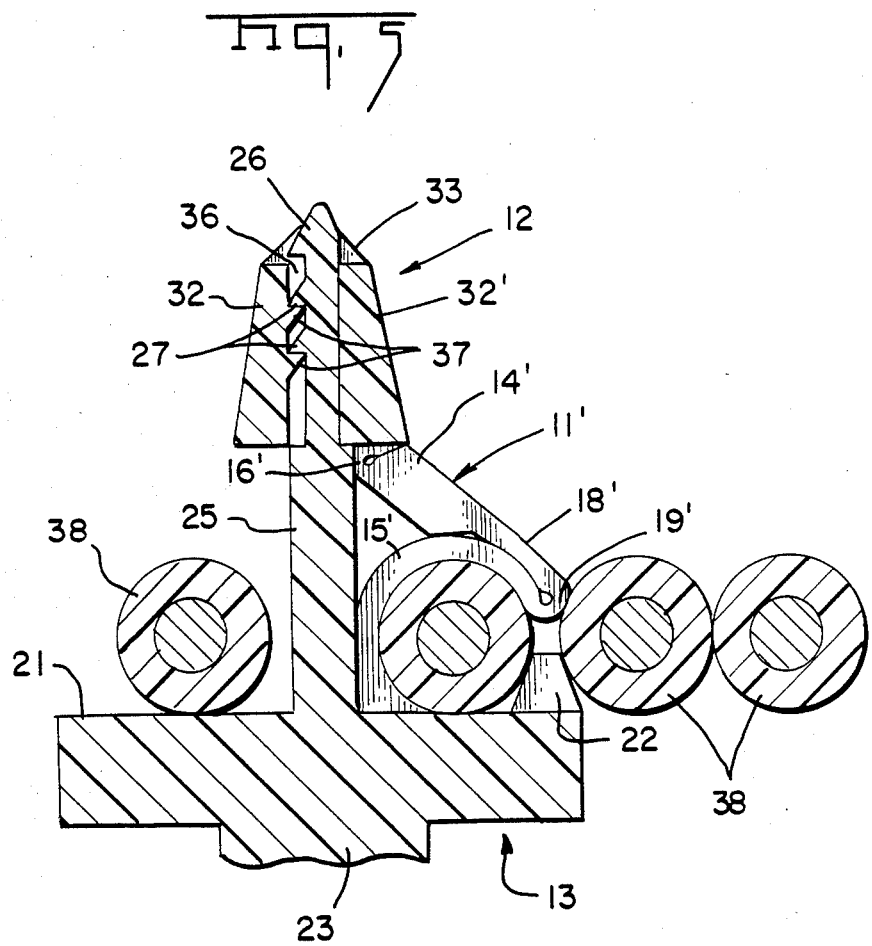
FIG. 5 is a cross-sectional view taken along line 5—5 of FIG. 3.

In operation, the leading edge 33 of the fastener is threaded between preselected wires of a row of parallel wires 38 to the condition of FIG. 2. Pressure is then applied to both tool bearing portions 12 and 13 to urge them together causing the legs 11, 11' to collapse laterally outwardly in opposite directions with the flexible portions 15 surrounding the wires to clamp them against the wire supporting surface 21, as shown in FIG. 5. Interengagement of the shoulders defining the slots 17, 17' limits leg deflection preventing overstress. During collapse of the legs 11, 12, the free end 26 of the tongue is received within the eye 36 to bring the detents 27 and 37 into latching engagement to secure the fastener in the latching condition.

It will be appreciated that, in an alternative example, suitable for some applications the orientation of the clamping legs may be altered to obtain collapse in other directions. For example, the flexible portion of one leg may be adjacent the rigid portion of the other leg. Alternatively the orientation of legs themselves may be rotated through 180° together with other minor displacements so that the right leg collapses in a left lateral direction and the left leg collapses in a right lateral direction.

Figure 6:
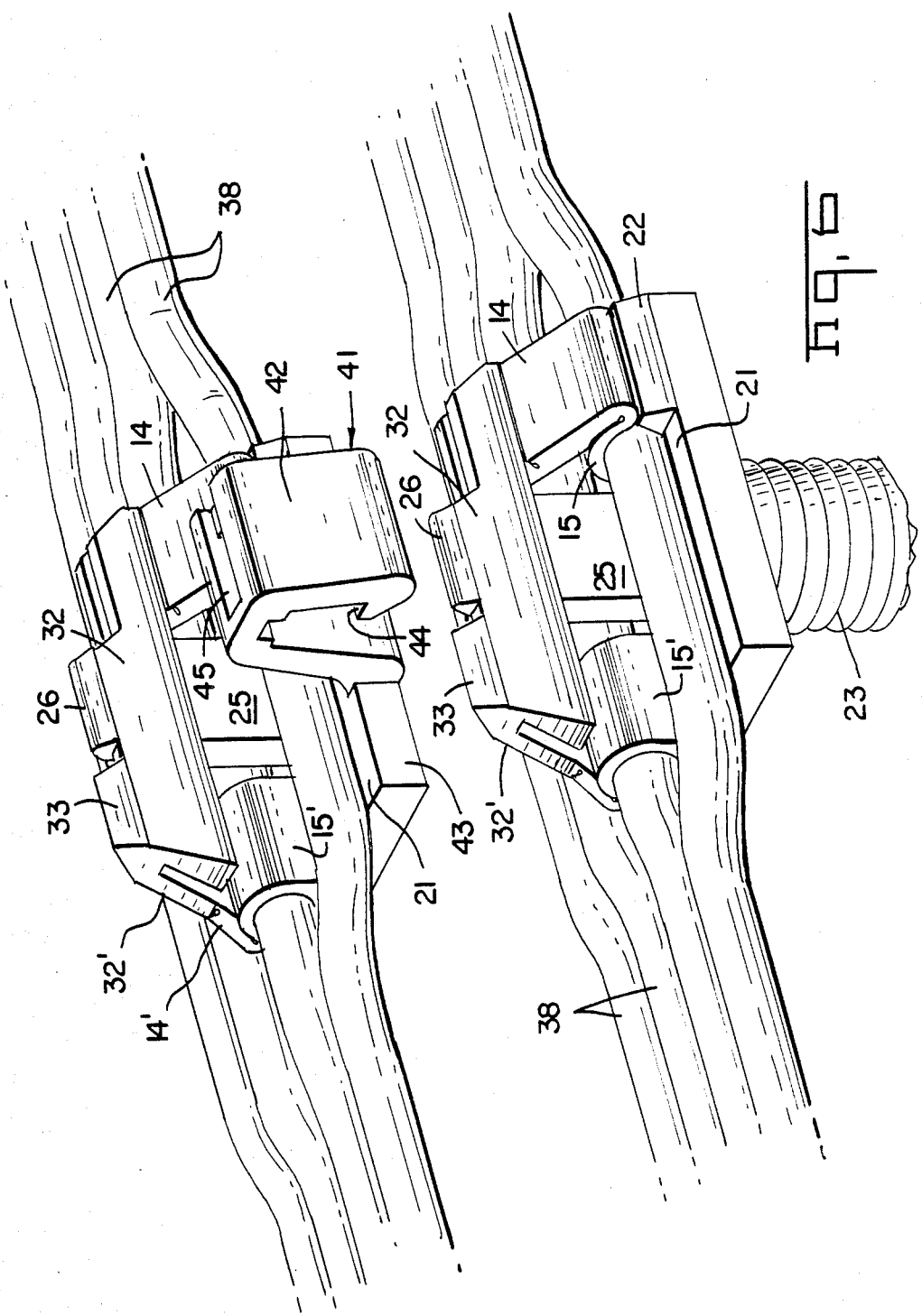
FIGS. 6 and 7 are perspective views of cable clamps showing an alternative mounting means.
Figure 7:
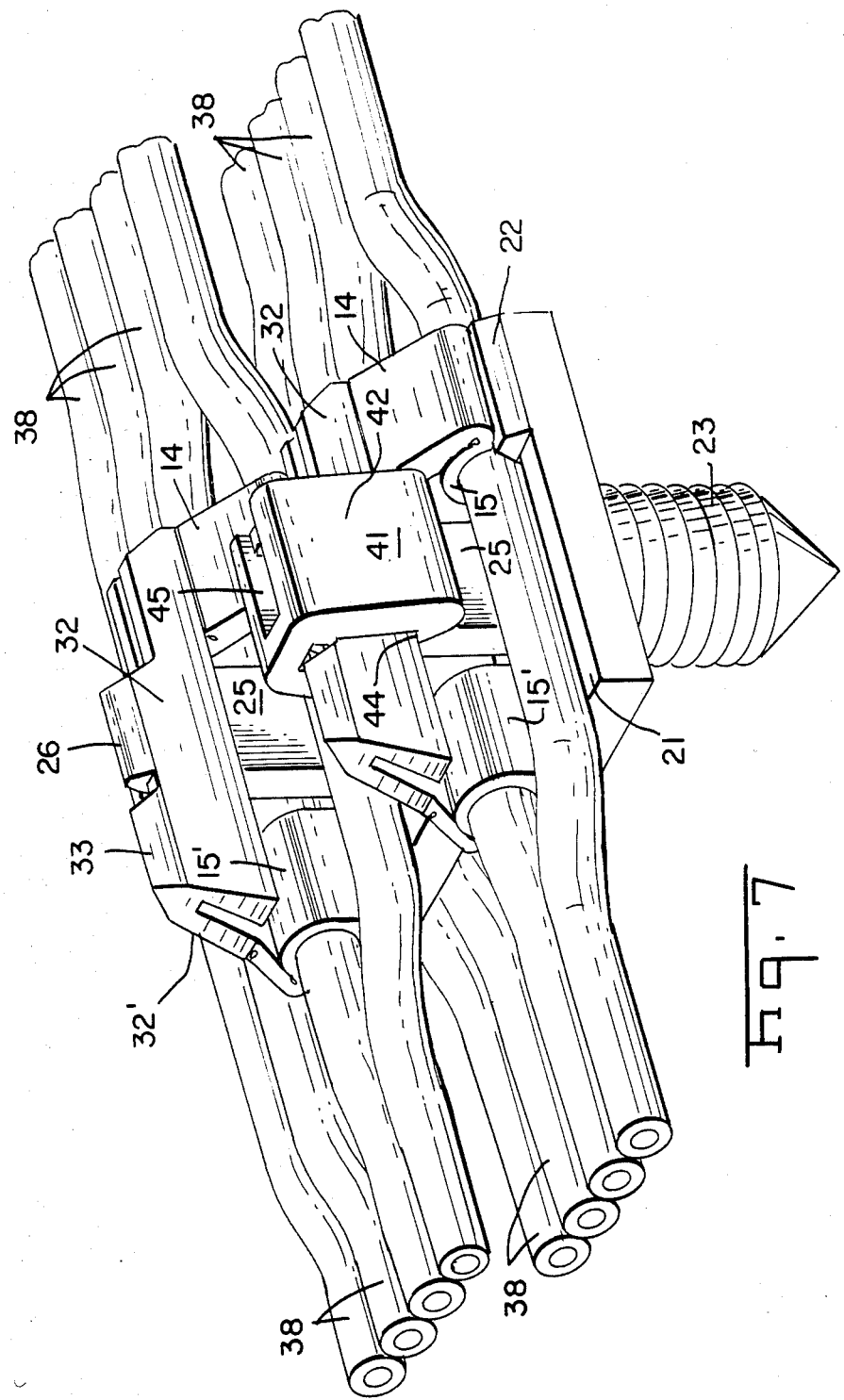

As shown in FIGS. 6 and 7, a modified mounting means 41 may comprise a hook 42 extending from a lateral edge of a second tool bearing portion 43 and having a latching shoulder 44 at a free end for engagement with an underside of the sidewall 32 of another cable clamp thereby to enable stacking of the cable clamp in a clamping condition. An eye 45 is formed in the hook in a similar manner to that of the eye 36 in the first tool bearing portion 12 of the above-described cable clamp.

We claim:

1. A cable clamp moulded in one piece from plastics material comprising first and second clamping limbs extending in side-by-side relation and joined at respective opposite ends by tool bearing portions, each clamping limb comprising a rigid portion at one end of the limb joined to a flexible wire engaging portion at the other end of the limb, laterally extending wire supporting surfaces being provided adjacent respective wire engaging portions such that on urging the tool bearing portions together, the clamping limbs are changed from an erect to a collapsed, clamping condition with deformation of the wire engaging portions around wires located adjacent the wire supporting surfaces thereby to clamp the wires against the wire supporting surfaces, means being provided on the cable clamp to latch the cable clamp in the clamping condition.

2. A cable clamp according to claim 1 in which the wire engaging portions of the clamping limbs are adjacent.

3. A cable clamp according to claim 1 in which the rigid portion of each clamping limb is joined to a portion defining the tool bearing surface by a web hinge.

4. A cable clamp according to claim 3 in which shoulder portions are provided on each side of the web hinge arranged to interengage on collapse of the clamping limb to limit pivotal movement of the rigid portion relative to the tool bearing portion.

5. A cable clamp according to claim 1 in which each rigid portion is joined to each flexible wire engaging portion by a web hinge.

6. A cable clamp according to claim 5 in which each web hinge joining a rigid and flexible wire engaging portion is an arcuate strip.

7. A cable clamp according to any one of claims 1 to 6 in which the latching means comprises an eye formed in one tool bearing portion and a tongue having a free end outstanding from the other tool bearing portion aligned for receipt in the eye by movement of the clamping legs from the erect to the collapsed, cable clamping condition thereby to bring latching detent means provided on the eye and free end of the tongue into latching engagement.

8. A cable clamp according to claim 2 in which the tool bearing portion adjacent the rigid portions has a pointed leading edge.

9. A cable clamp according to claim 7 in which the cable clamping limbs and the latching tongue are located in separate planes in the lateral direction.

10. A cable clamp according to claim 5 in which each leg diverges in the lateral direction from a medial plane as it extends from the rigid to the flexible wire engaging portion.

11. A cable clamp moulded in one piece from plastics material comprising first and second clamping limbs extending in side-by-side relation and joined at respective opposite ends by first and second tool bearing portions, each clamping limb comprising a rigid portion joined to the first tool bearing portion by a web hinge at one end of the limb and joined by a web hinge to a flexible wire engaging portion at the other end of the limb, laterally extending wire supporting surfaces being provided adjacent respective wire engaging portions adjacent the second bearing portion such that on urging the tool bearing portions together, the clamping limbs are changed from erect to collapsed clamping conditions with deformation of the wire engaging portions around wires located adjacent the wire supporting surfaces thereby to clamp the wires against the wire supporting sufaces, means being provided on the cable clamp to latch the cable clamp in the clamping condition.

12. A cable clamp according to claim 11 in which the latching means comprises an eye formed in one tool bearing portion and a tongue having a free end outstanding from the other tool bearing portion aligned for receipt in the eye by movement of the clamping legs from the erect to the collapsed, cable clamping condition thereby to bring latching detent means provided on the eye and free end of the tongue into latching engagement.

13. A cable clamp according to claim 1 in which mounting means are provided for attachment to a support.

* * * * *